United States Patent [19]
Selvidge

[11] 3,893,909
[45] July 8, 1975

[54] FUEL OIL PRODUCTION BY BLENDING HYDRODESULFURIZED VACUUM GAS OIL AND HYDRODESULFURIZED DEASPHALTED RESIDUUM

[75] Inventor: Charles W. Selvidge, Palatine, Ill.

[73] Assignee: Universal Oil Products Company, Des Plaines, Ill.

[22] Filed: Oct. 26, 1973

[21] Appl. No.: 409,988

Related U.S. Application Data
[63] Continuation-in-part of Ser. No. 212,477, Dec. 27, 1971, abandoned.

[52] U.S. Cl. ............... 208/211; 208/216; 208/218
[51] Int. Cl. ........................................ C10g 23/02
[58] Field of Search .......... 208/210, 211, 218, 212, 208/216

[56] References Cited
UNITED STATES PATENTS

| | | | |
|---|---|---|---|
| 2,892,774 | 6/1959 | Porter et al. | 208/218 |
| 2,925,374 | 2/1960 | Gwin et al. | 208/86 |
| 2,943,047 | 6/1960 | Reeg et al. | 208/211 |
| 3,155,607 | 11/1964 | Friess | 208/212 |
| 3,444,073 | 5/1969 | Beuther et al. | 208/211 |
| 3,775,305 | 11/1973 | McKinney et al. | 208/210 |
| 3,804,748 | 4/1974 | Nelson et al. | 208/211 |
| 3,830,731 | 8/1974 | Reed, Jr. et al. | 208/216 |

Primary Examiner—Delbert E. Gantz
Assistant Examiner—G. J. Crasanakis
Attorney, Agent, or Firm—James R. Hoatson, Jr.; Robert W. Erickson; William H. Page II

[57] ABSTRACT

An asphaltic, hydrocarbonaceous charge stock, containing more than about 2.0% by weight of sulfur and more than about 150 ppm. by weight of metallics, is converted to a low-sulfur fuel oil in a plurality of catalytic conversion zones. The charge stock is initially separated to provide a light fraction and an asphaltic-containing heavy fraction. The latter is subjected to deasphalting to provide a deasphalted oil, containing from 30–100 ppm. of metallics, and precipitated asphaltics. The light fraction and deasphalted oil are individually subjected to hydrodesulfurization in separate reaction systems. The fuel oil product, in admixture with the precipitated asphaltics, has a sulfur concentration less than about 1.0% by weight.

4 Claims, 1 Drawing Figure

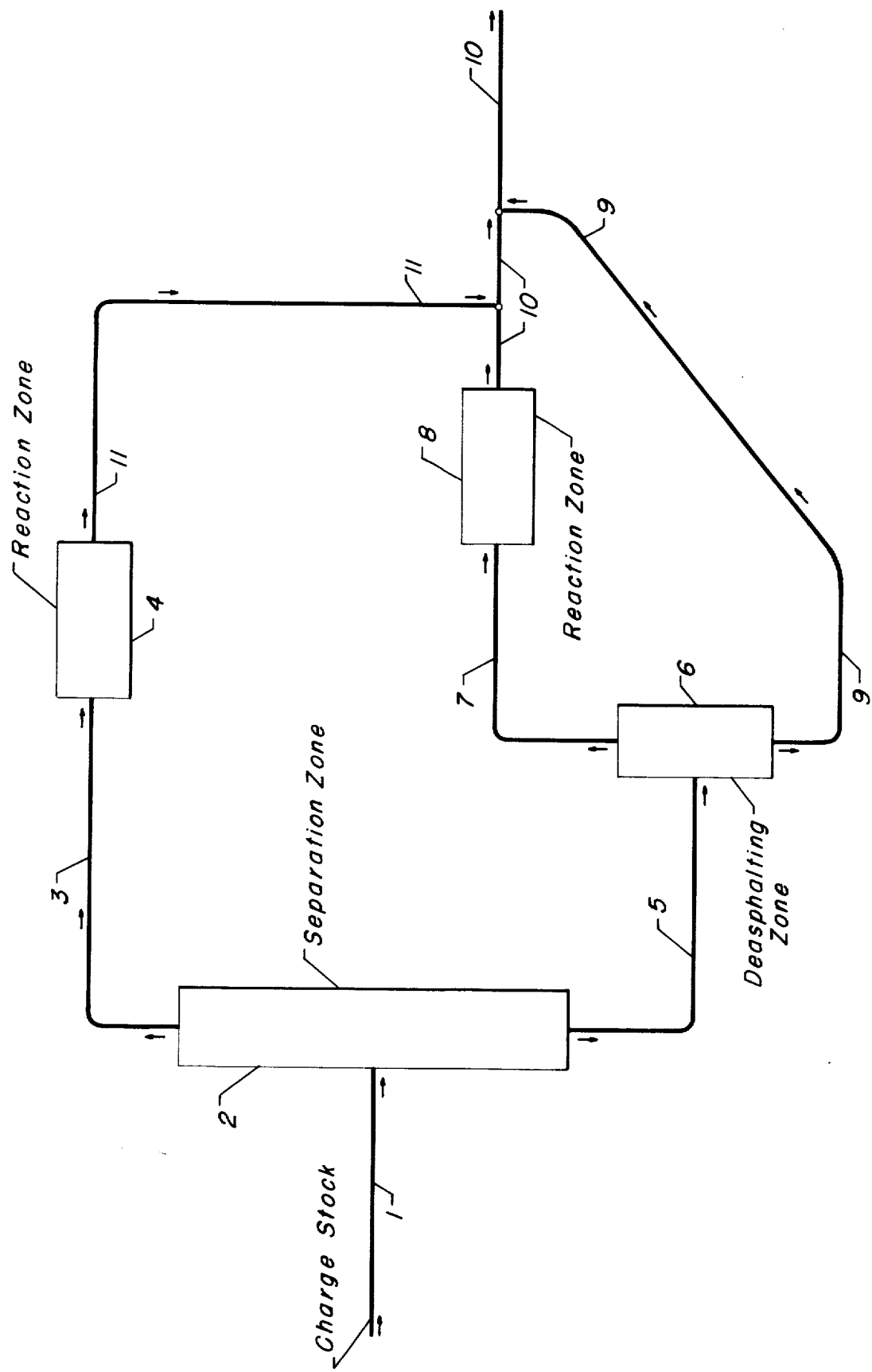

3,893,909

FUEL OIL PRODUCTION BY BLENDING HYDRODESULFURIZED VACUUM GAS OIL AND HYDRODESULFURIZED DEASPHALTED RESIDUUM

RELATED APPLICATION

The present application is a continuation-in-part of my copending application, Ser. No. 212,477, filed Dec. 27, 1971, all the teachings of which are incorporated herein by specific reference thereto.

APPLICABILITY OF INVENTION

Desulfurization is a process well known and thoroughly described in petroleum technology, the literature relating thereto being replete with references directed toward suitable desulfurization catalysts, methods of catalyst manufacture and various operating techniques. Desulfurization alludes to the destructive removal of sulfurous compounds, through the conversion thereof to hydrogen sulfide and hydrocarbons, and is often included in the broad term "hydrorefining." Hydrorefining processes are effected at operating conditions which serve to promote denitrification and desulfurization primarily, asphaltene conversion, non-distillable hydrocarbon conversion, hydrogenation and hydrocracking to a somewhat lesser extent. In other words, the terms "hydrorefining" and "desulfurization" are generally employed synonymously to connote a process wherein a hydrocarbon feed stock is "cleaned-up" in order to prepare either a charge stock suitable for utilization in subsequent hydrocarbon conversion, or to recover a product having an immediate utility. The combination process of my invention can be beneficially utilized to produce a fuel oil containing less than about 1.0% by weight of sulfur, while simultaneously effecting at least partial conversion into lower-boiling hydrocarbon products.

Recent recognition of the necessity to inhibit the discharge of various pollutants into the atmosphere has resulted in governmental limitations being imposed in a number of locales. Notable among these concerns the burning of high-sulfur content fuels, principally coal and fuel oil, the combustion of which results in the atmospheric discharge of exceedingly large quantities of sulfur dioxide. With respect to fuel oils derived from petroleum crude oil, the demand therefor has increased significantly as a result of increased energy requirements; of greater import, however, is the fact that legislation has already been imposed, in some locales, limiting the concentration of sulfur, calculated as the element, to a maximum of 1.0% by weight. Experts in this particular area are currently predicting that the next several years will see the maximum sulfur content of fuel oils being restricted to a level less than about 0.5% by weight. It is to this end that the present invention is specifically directed; that is, the producttion of hydrocarbonaceous fuel oils containing less than about 1.0% by weight of sulfur, and, where required, to a level less than about 0.5% by weight. The increasing demand for low-sulfur content fuel oils has also brought about the necessity for effecting the conversion of the "bottom of the barrel" of petroleum crude oils. Stated differently, the increasing demand for fuel oil has in turn necessitated the utilization of virtually 100.0% of a petroleum crude oil.

In accordance with the present combination process, acceptable fuel oils are derived via the desulfurization of petroleum crude oils, atmospheric tower bottoms products, vacuum tower bottoms products, heavy cycle stocks, crude oil residuum, topped crude oils, heavy hydrocarbonaceous oils extracted from tar sands, etc. Crude oils, and the heavier hydrocarbon fractions and/or distillates obtained therefrom contain nitrogenous and sulfurous compounds in exceedingly large quantities, the latter generally being in the range of about 2.5% to about 6.0% by weight, calculated as elemental sulfur. In addition, these heavy hydrocarbon fractions, sometimes referred to in the petroleum art as "black oils," contain large quantities of organometallic contaminants, generally from 125 ppm. to as high as 700 ppm. and principally comprising nickel and vanadium, and high molecular weight insoluble asphaltenes. Illustrative of those charge stocks, to which the present invention is applicable, are a vacuum tower bottoms product having a gravity of 7.1 °API and containing 4.05% by weight of sulfur and 23.7% by weight of asphaltenes; a "reduced" Middle-east crude oil, having a gravity of 14.4 °API, and containing 7.33% by weight of asphaltenes, 2.6% by weight of sulfur and 730 ppm. of metals; and, a vacuum residuum having a gravity of about 8.8 °API and containing 3.0% by weight of sulfur, 4,300 ppm. by weight of nitrogen, and having a 20.0% volumetric distillation temperature of about 1055°F. The utilization of the process of the present invention affords the maximum recovery of low-sulfur content fuel oil from these heavier hydrocarbonaceous charge stocks.

OBJECTS AND EMBODIMENTS

A principal object of the present invention is to provide a process for effecting the desulfurization of hydrocarbonaceous material. A corollary objective resides in a multiple-stage process for desulfurizing heavy hydrocarbonaceous material in order to produce an acceptable fuel oil containing less than about 1.0% by weight of sulfur.

Another object of my invention is to afford a desulfurization process for the maximum recovery of a fuel oil product from hydrocarbonaceous black oils, and at a lower level of operating severity.

Therefore, in one embodiment, my invention involves a process for producing fuel oil containing less than about 1.0% by weight of sulfur, from an asphaltic hydrocarbonaceous charge stock, which process comprises the steps of: (a) separating said charge stock, in a vacuum distillation zone, to provide a light fraction substantially free from asphaltics and a heavy asphaltenic fraction; (b) reacting said light fraction and hydrogen in a first catalytic reaction zone, at desulfurization conditions selected to convert sulfurous compounds into hydrogen sulfide and hydrocarbons, including a maximum catalyst bed temperature in the range of about 600°F. to about 880°F. and a pressure less than about 1,500 psig.; (c) deasphalting at least a portion of said heavy fraction with a selective solvent in a solvent extraction zone to provide a solvent-rich normally liquid phase and a solvent-lean asphaltene concentrate; (d) reacting at least a portion of said liquid phase with hydrogen in a second catalytic reaction zone, at desulfurization conditions selected to convert sulfurous compounds into hydrogen sulfide and hydrocarbons, including a pressure less than about 1,500 psig. and a maximum catalyst bed temperature in the range of about 620°F. to about 920°F., and at least about 20°F. higher than the temperature in said first reaction zone; and, (e) recovering a fuel oil product, containing less than about 1.0% by weight of sulfur from the effluent from said first and second reaction zones.

Other embodiments of my invention, as hereinafter set forth in greater detail, reside primarily in preferred ranges of process variables, various processing techniques and preferred catalytic composites for utilization in the fixed-bed catalytic reaction zones. For example, in one such other embodiment, the precipitated asphaltene concentrate is admixed with the fuel oil product recovered from the first and second reaction zones in order to increase the overall volumetric yield.

Other contemplated objects and embodiments of my invention will become evident from the following, more detailed description of the combination process encompassed thereby.

SUMMARY OF INVENTION

The present invention utilizes at least two fixedbed catalytic reaction zones in combination with separation facilities and a deasphalting zone. Briefly, the combination process is effected by initially separating the charge stock into a substantially asphaltene-free light fraction and a heavy fraction concentrated in asphaltics. Although this initial separation may be effected in any suitable manner known to the art, the utilization of a standard vacuum column functioning at an absolute pressure of about 25 to about 60 mm. of Hg., appears to be most suitable from the standpoint of achieving the desired result. The heavy phase is subjected to solvent deasphalting to precipitate asphaltenes, to remove metallic contaminants and to recover a solvent-rich normally liquid phase which is subjected to desulfurization at conditions including a temperature in the range of about 620°F. to about 900°F. The light fraction, herein referred to as vacuum gas oil, is subjected to desulfurization in a separate reaction zone at desulfurizing conditions including a temperature in the range of about 600°F. to about 880°F. and at least 20°F. lower than that temperature imposed upon the reaction zone which effects the desulfurization of the deasphalted oil. The fuel oil product is recovered from the first and second reaction zone effluents, and preferably admixed with the asphaltic fraction to increase the overall volumetric yield. As previously stated, the present combination, mutiple-stage desulfurization process is specifically directed toward asphaltic feed stocks containing more than about 150 ppm. by weight of metallic contaminants, calculated as elemental metals. The deasphalting operation is effected to reduce the metals content of the heavy fraction to a level in the range of about 30–100 ppm. by weight. Since substantially all the metals are not removed, the volumetric yield of deasphalted oil (DAO) is significantly increased. While the yield advantage stems directly from the retention of metal contaminants in the DAO, the latter is afforded as a result of a particular catalytic composite which is utilized in the reaction zone to which the DAO is charged. The high resistance of this catalyst to metal deactivation is attributed to its pore structure which provides a large pore volume for metal accumulation.

The advantages of the described process, in addition to the foregoing, are numerous; however, principal among these is a significant reduction in operating severity – i.e. much lower pressure levels – accompanied by an extension of the effective acceptable life of the catalytic composites used in both reaction zones. Furthermore, hydrogen consumption is lessened considerably, compared to direct reduced crude desulfurization, since no asphaltic material is present in the charge to the reaction zones and a lower desulfurization pressure is possible.

Although the catalytic composites will be of different physical and chemical characteristics in many instances, they may be identical. Regardless, the catalytic composites utilized in the present combination process comprise metallic components selected from the metals of Group VI–B and VIII of the Periodic Table, and compounds thereof. Thus, in accordance with the *Periodic Table of The Elements*, E. H. Sargent & Co., 1964, suitable metallic components are those selected from the group consisting of chromium, molybdenum, tungsten, iron, ruthenium, osmium, cobalt, rhodium, iridium, nickel, palladium and platinum. Additionally, recent investigations have indicated that catalytic composites, for utilization with excessively high-sulfur content feed stocks, are improved through the incorporation of a zinc and/or bismuth component. While neither the precise composition, nor the method of manufacturing the various catalytic composites, is considered essential to my invention, certain aspects are preferred. In particular, the catalytic composites, especially that employed in processing the DAO, are characterized by a relatively large pore volume, above about 0.5 cc./gm., which permits the catalyst to accommodate metal accumulation unaccompanied by rapid catalyst deactivation. Thus, the effective life of the catalyst, expressed as barrels of charge stock per pound of catalyst (BPP), is significantly extended. Furthermore, since the charge stock to the present process is extremely heavy, it is preferred that the components of the catalyst possess the propensity for effecting a limited degree of hydrocracking while simultaneously promoting the conversion of sulfurous compounds into hydrogen sulfide and hydrocarbons. The concentration of the catalytically active metallic component, or components, is primarily dependent upon the particular metal as well as the physical and/or chemical characteristics of the charge stock. For example, the metallic components of Group VI–B are generally present in an amount within the range of about 4.0% to about 30.0% by weight, the Iron-group metals in an amount within the range of about 0.2 to about 10.0% by weight, whereas the noble metals of Group VIII are preferably present in an amount within the range of about 0.1 to about 5.0% by weight, all of which are calculated as if these components existed within the catalytic composite in the elemental state.

The carrier material, with which the catalytically active metallic components are combined, comprises a refractory inorganic oxide of the character thoroughly described in the literature. When of the amorphous type, alumina, or alumina in combination with 10.0 to about 90.0% of silica is preferred. When processing heavier charge stocks containing a significant quantity of hydrocarbons boiling above a temperature of about 950°F., it may be appropriate to utilize a carrier material comprising a crystalline aluminosilicate, or zeolitic molecular sieve. In most instances, such a carrier material will be utilized in processing the deasphalted oil in the second reaction zone. The zeolitic material includes mordenite, faujasite, Type A or Type U molecular sieves, etc., and these may be employed in a substantially pure state; however, it is understood that the zeolitic material may be included within an amorphous matrix such as silica, alumina, and mixtures of alumina and silica. It is further contemplated that the catalytic composites may have a halogen component incorporated therein, such components selected from the group consisting of fluorine, chlorine, iodine, bromine and mixtures thereof. The halogen component will be composited with the carrier material in such a manner as results in a final catalytic composite containing from about 0.1 to about 2.0% by weight.

The metallic components may be incorporated within the catalytic composite in any suitable manner including coprecipitation or cogellation with the carrier material, ionexchange or impregnation of the carrier material. Following the incorporation of the metallic components, the carrier material is dried and subjected to a high temperature calcination or oxidation technique at a temperature of about 750°F. to about 1300°F. When a crystalline aluminosilicate is utilized within the carrier material, the upper limit for the calcination technique is preferably about 1000°F.

Current attempts to recover maximum quantities of a low-sulfur content fuel from asphaltene-containing charge stocks have been relatively unsuccessful. This is primarily due to the presence of high molecular weight sulfurous compounds and organometallics in the asphaltic fraction. The conversion of these high molecular weight sulfurous compounds must necessarily be effected at an elevated operating severity with the result that excessive cracking to lower-boiling hydrocarbons – i.e. below the fuel oil boiling range – takes place. Additionally, the asphaltics tend to further agglomerate at a high severity operation causing the catalytic composite to exhibit a rapid decline in activity and stability. In accordance with the combination process of the present invention, the light fraction of the charge stock, for example, having an end boiling point of about 950°F. is subjected to desulfurization at a relatively mild operating severity. The heavy fraction, containing the high molecular weight sulfurous compounds, is processed at a higher severity level following the precipitation therefrom of the asphaltic concentrate. The desired fuel oil product is recovered as the effluent streams from both catalytic reaction zones, and, in a preferred embodiment, the precipitated asphalt is combined therewith to increase the overall yield. The variance in operating severity levels between the two reaction zones is readily attained by adjustment of the pressure, maximum catalyst bed temperature and liquid hourly space velocity variables. The higher severity operation will normally be effected at a slightly increased pressure, an increased maximum catalyst bed temperature and at a decreased liquid hourly space velocity, or some combination thereof. In any event, the maximum catalyst bed temperature within the first reaction zone will be at least about 20°F. lower than that maintained within the second reaction zone.

With respect to the operating conditions imposed upon the catalytic reaction zones, they are selected primarily to effect the conversion of sulfurous compounds to hydrogen sulfide and hydrocarbons. As hereinabove set forth, the operating conditions imposed upon the second reaction zone will result in a greater operating severity. However, with the exception of the maximum catalyst bed temperature, suitable ranges for the various operating variables will generally be the same for both reaction systems. Thus, the pressure will range from about 500 to about 1,500 psig. Within the first reaction zone, the maximum catalyst bed temperature will be within the range of about 600°F. to about 880°F., while the maximum catalyst bed temperature within the second reaction zone will be from about 620°F. to about 900°F. In view of the fact that the reactions being effected are principally exothermic, an increasing temperature gradient will be experienced in both reaction zones as the reactants traverse the catalyst bed. Preferred operating techniques dictate that the increased temperature gradient be limited to a maximum of about 100°F., and, in order to control the temperature gradient, it is within the scope of the present invention to employ quench streams, either normally liquid, or normally gaseous, introduced at one or more intermediate loci of the catalyst bed. The hydrogen concentration is expressed as "standard cubic feet per barrel of charge stock", and will usually be within the range of about 1,500 to about 30,000. Liquid hourly space velocities, defined as volumes of normally liquid hydrocarbons charged per hour, per volume of catalyst disposed within the given reaction zone, will be from about 0.25 to about 2.50. In addition to the temperature variable, the liquid hourly space velocity variable is conveniently utilized to adjust the operating severity between the reaction zones. Thus, the liquid hourly space velocity through the second reaction zone will generally be less than that through the first reaction zone.

The fresh feed charge stock to the present process is subjected to a low-pressure separation, and preferably at a subatmospheric pressure level. For this purpose, the standard vacuum distillation column appears to be most suitable, and will function at an absolute pressure within the range of about 25 to about 60 mm. of Hg. The temperature of the feed to the separation zone will be selected to provide a light fraction which is substantially free from asphaltenic material.

The present combination process utilizes a solvent deasphalting, or solvent extraction zone, to precipitate an asphaltic concentrate from the heavy fraction recovered from the separation zone. It must be acknowledged that the prior art is replete with a wide spectrum of techniques for effecting solvent deasphalting of asphaltene-containing hydrocarbonaceous charge stocks. It is understood, therefore, that no attempt is herein made to claim solvent deasphalting other than as it is used as an integral element of the present combination process. Any suitable solvent deasphalting technique known in the prior art may be employed, several examples of which are hereinafter described. In the interest of brevity, no attempt will be made to delineate exhaustively the solvent deasphalting art.

PRIOR ART

Exemplary of such prior art is U.S. Pat. No. 1,948,296 (Class 208–4) in which the separated asphaltic fraction is admixed with a suitable oil and subjected to oxidation to obtain a particularly good asphalt product. The described solvents, for utilization in precipitating the asphaltic fraction, include light petroleum hydrocarbons such as naphtha, casinghead gasoline, light petroleum fractions comprising propane, n-butane and isobutane, certain alcohols, ether and mixtures thereof, etc.

U.S. Pat. No. 2,002,004 (Class 208-14) involves a two-stage deasphalting process wherein the second stage completes the precipitation of asphalts which was partially effected in the first stage. As noted previously, the described solvents include naphtha, gasoline, casinghead gasoline, and liquefied normally gaseous hydrocarbons such as ethane, propane, butanes and mixtures thereof.

U.S. Pat. No. 2,914,457 (Class 208-79) described a multiple combination process involving fractionation, vacuum distillation, solvent deasphalting, hydrogenation and catalytic reforming. Again, the suitable liquid deasphalting solvents include liquefied normally gaseous hydrocarbons such as propane, n-butane, isobutane, as well as ethane, ethylene, propylene, n-butylene, isobutylene, pentane, isopentane and mixtures thereof.

U.S. Pat. 2,943,047 (Cl. 208-211) involves a combination of deasphalting and hydrorefining (desulfurization), wherein the fresh feed charge stock is separated into two fractions. With respect to the present combination process, this is where any similarity ends. Immediately noted is the fact that the prior art process requires pressure stripping of the fresh charge stock, with off-gas (recycle) from the hydrorefining zone, to provide the light and heavy fraction. The latter, following solvent precipitation of all the deposit-forming constituents, is commingled with the former, the mixture being charged to a single reaction zone. Clearly, there is no recognition of separately processing the light fraction and the heavy fraction after deasphalting to the extent that from 30-100 ppm. of metals remain therein.

In accordance with the present invention, at least a portion of the heaavy normally liquid phase, concentrated in asphaltenes, is introduced into an upper portion of a solvent deasphalting zone, wherein it countercurrently contacts a suitable selective solvent which is introduced into a lower portion thereof. The solvent deasphalting zone will function at a temperature in the range of about 50°F. to about 500°F., and preferably from about 100°F. to about 300°F.; the pressure will be maintained within the range of about 100 to about 1,000 psig., and preferably from about 200 to about 600 psig. The precise operating conditions will generally depend upon the physical characteristics of the charge stock as well as the selected solvent. In general, the solvent, temperature and pressure are selected to maintain the deasphalting operation in liquid phase and to insure that substantially all the asphaltenes are removed, while retaining 30-100 ppm. by weight of metals. Suitable solvents include those hereinbefore described with respect to prior art deasphalting techniques. Thus, it is contemplated that the solvent will be selected from the group of light hydrocarbons such as ethane, methane, propane, butane, isobutane, pentane, isopentane, neopentane, hexane, isohexane, heptane, the mono-olefinic counterparts thereof, etc. Furthermore, the solvent may be a normally liquid naphtha fraction containing hydrocarbons having from about 5 to about 14 carbon atoms per molecule, and preferably a naphtha fraction having an end boiling point below about 200°F. The solvent-rich normally liquid phase is introduced into a suitable solvent recovery system, the design and techniques of which are thoroughly described in the prior art. As hereinafter set forth, the solvent-lean heavy phase (asphaltic concentrate) is preferably combined with the low sulfur fuel oil product in order to increase the overall volumetric yield.

DESCRIPTION OF DRAWING

One embodiment of the present invention is presented in the accompanying drawing by means of a simplified flow diagram in which details such as pumps, instrumentation and controls, heat-exchange and heat-recovery circuits, valving, start-up lines and similar hardware have been omitted as being non-essential to an understanding of the techniques involved. The utilization of such miscellaneous appurtenances, to modify the illustrated process flow, is well within the purview of those having skill in the art of petroleum refining operations and techniques. With reference now to the drawing, the illustrated embodiment will be described in conjunction with a commercially-scaled unit processing about 40,000 Bbl./day of a reduced crude oil having a gravity of 16.2 °API and containing 3.97% by weight of sulfur, 2,200 ppm. by weight of nitrogen and about 225 ppm. of metals. The intended object is to recover a maximum quantity of a 650°F.-plus fuel oil having a sulfur content less than about 1.0% by weight.

The reduced crude charge stock is introduced into the process by way of line 1, and, following heat-exchange with various hot effluent streams and further heating, is introduced into separation zone 2 at a temperature of about 790°F. In the illustrated embodiment, separation zone 2 is a vacuum column functioning at 25 mm. of Hg., absolute, through the utilization of standard vacuum jets not illustrated in the drawing. A vacuum gas oil, in the amount of about 61.5% by volume (24,600 Bbl./day) is withdrawn by way of line 3 and introduced into desulfurization reaction zone 4. Reaction zone 4 contains a catalytic composite of an alumina carrier material, 2.0% by weight of cobalt and 12.0% by weight of molybdenum, calculated as the elements. The maximum catalyst bed temperature is controlled at a level of about 780°F., and is under an imposed pressure of about 800 psig. The charge stock, in admixture with about 2,000 scf./Bbl. of hydrogen, traverses the catalyst bed at a liquid hourly space velocity of about 1.0. A heavy fraction, containing asphaltics, is withdrawn from separation zone 2 by way of line 5 in an amount of about 38.5% by volume (15,400 Bbl./day), and is introduced into deasphalting zone 6. The deasphalting technique is effected at a temperature of about 280°F. and a pressure of about 400 psig., and the charge stock countercurrently contacts a solvent consisting of a mixture of n-butane and isopentane. Deasphalted oil, in an amount of about 11,903 Bbl./day, containing 34 ppm. by weight of metals, is introduced by way of line 7 into desulfurization reaction zone 8. An asphaltic concentrate in an amount of about 3,497 Bbl./day is removed from a lower portion of deasphalting zone 6 by way of line 9.

Reaction zone 8 contains a catalytic composite of a carrier material comprising alumina, 2.0% by weight of cobalt and about 12.0% by weight of molybdenum, calculated as the elements thereof, and has a pore volume of 0.62 cc./gm. The reaction zone is maintained under an imposed pressure of about 1,200 psig., and the maximum catalyst bed temperature is maintained at a level of about 800°F. The charge stock, in admixture with about 3,000 scf./Bbl. of hydrogen, traverses the catalyst bed at a liquid hourly space velocity of about 0.7. Following separation, to recover a 650°F.-plug distillable product in line 10, and from reaction zone 4 by way of line 11, the total fuel oil product in line 10 is admixed with the asphaltic concentrate in line 9 to increase the volumetric yield to about 96.81%, based upon the total fresh feed in line 1.

The vacuum gas oil product recovered in line 11 has a sulfur concentration of about 0.15% by weight, while the fuel oil recovered from the deasphalted oil has a sulfur concentration of about 0.5% by weight. When admixed with the asphaltic concentrate in line 9, the total fuel oil product has a sulfur concentration of about 0.95% by weight.

I claim as my invention

1. A process for producing fuel oil containing less than about 1.0% by weight of sulfur, from an asphaltic hydrocarbonaceous charge stock containing more than about 150 ppm. of metals, which process comprises the steps of:
   a. separating said charge stock in a vacuum distillation zone to provide a vacuum gas oil fraction substantially free from asphaltics and a vacuum residuum asphaltenic fraction;
   b. reacting said vacuum gas oil fraction and hydrogen in a first catalytic reaction zone containing a hydrodesulfurization catalyst, at desulfurization conditions selected to convert sulfurous compounds into hydrogen sulfide and hydrocarbons, including a catalyst bed temperature in the range of about 600°F. to about 880°F. and a pressure from about 500 to about 1,500 psig.;
   c. deasphalting at least a portion of said vaccum residduum fraction with a deasphalting solvent in a solvent extraction zone to provide a solvent-rich liquid oil phase containing from about 30 to about 100 ppm. by weight of metals and a solvent-lean asphaltene concentrate;
   d. reacting at least a portion of said liquid oil phase from step (c) with hydrogen in a second catalytic reaction zone, at desulfurization conditions selected to convert sulfurous compounds into hydrogen sulfide and hydrocarbons, including a pressure from about 500 to about 1,500 psig. and a catalyst bed temperature in the range of about 620°F. to about 900°F., and at least about 20°F. higher than the temperature in said first reaction zone, said catalyst in said second catalytic reaction zone comprising a Group VI-B and a Group VIII metal on alumina, said catalyst having a pore volume greater than 0.5 cc./gm.; and,
   e. recovering a fuel oil product, containing less than about 1.0% by weight of sulfur by blending the desulfurized gas oil with the desulfurized liquid oil from step (d).

2. The process of claim 1 further characterized in that said asphaltene concentrate is admixed with said fuel oil product.

3. The process of claim 1 further characterized in that the desulfurization conditions, in said first and second reaction zones, include a hydrogen concentration in the range of about 1,500 to about 30,000 scf./Bbl. and a liquid hourly space velocity of from about 0.25 to about 2.50.

4. The process of claim 1 further characterized in that said first reaction zone has disposed therein a catalytic composite of a porous carrier material, a Group VI-B metal component and a Group VIII metal component.

* * * * *